D. L. SUMMEY.
MACHINE FOR EXTRUDING METAL.
APPLICATION FILED JULY 28, 1916.

1,317,238.

Patented Sept. 30, 1919.
6 SHEETS—SHEET 1.

D. L. SUMMEY.
MACHINE FOR EXTRUDING METAL.
APPLICATION FILED JULY 28, 1916.

1,317,238.

Patented Sept. 30, 1919.
6 SHEETS—SHEET 2.

Inventor:
David L. Summey
by his Att'ys:
Philipp Sawyer Rice & Kennedy

D. L. SUMMEY.
MACHINE FOR EXTRUDING METAL.
APPLICATION FILED JULY 28, 1916.

1,317,238.

Patented Sept. 30, 1919.
6 SHEETS—SHEET 4.

Inventor:
David L. Summey
by his Attys:

D. L. SUMMEY.
MACHINE FOR EXTRUDING METAL.
APPLICATION FILED JULY 28, 1916.

1,317,238.

Patented Sept. 30, 1919.
6 SHEETS—SHEET 5.

Fig. 12.

Inventor:
David L. Summey
by his Atty's:
Philipp Jacques Rice & Kennedy

UNITED STATES PATENT OFFICE.

DAVID L. SUMMEY, OF WATERBURY, CONNECTICUT, ASSIGNOR TO SCOVILL MANUFACTURING COMPANY, A CORPORATION OF CONNECTICUT.

MACHINE FOR EXTRUDING METAL.

1,317,238.　　　　　　　　Specification of Letters Patent.　　Patented Sept. 30, 1919.

Application filed July 28, 1916. Serial No. 111,756.

*To all whom it may concern:*

Be it known that I, DAVID L. SUMMEY, a citizen of the United States, residing at Waterbury, county of New Haven, and State of Connecticut, have invented certain new and useful Improvements in Machines for Extruding Metal, fully described and represented in the following specification and the accompanying drawings, forming a part of the same.

This invention relates to machines for extruding metal.

Machines of this sort ordinarily include a ram, operating under high pressure, which acts on a billet to force the metal through a die thereby to form a rod, tube or the like. The commercial success of such a machine depends upon various features. For example, the machine should be strong and rugged on account of the great pressure involved; it should be capable of such relatively wide range of use that the product is not restricted to any specific article; because of deleterious effects on the die from overheating, it is deemed expedient to cool the die after each extrusion; and to obtain a proper output the machine must operate with substantial rapidity and without undue delay between extrusions.
Extrusion machines as heretofore known have failed to attain the proper commercial standard because deficient along one or more lines such as those mentioned.

It is the object of the present invention to provide an extrusion press which is strong and rugged and which is capable of a relatively wide range of use; one comparatively simple in its construction and arrangement and at the same time thoroughly effective in performing its functions; and, withal, a press capable of operation such that each extrusion cycle is carried on with rapidity and the successive cycles are practically non-intermittent, so that the output produced satisfies the demands of commercial requirements.

The following specification describes and the accompanying drawings illustrate preferred embodiments of the invention, it being understood that changes may be made in the form, construction and arrangement of the parts without departing from the invention.

In the drawings—

Fig. 9 is a similar view showing a horizontal cross-section of the same;

The billet which is to be formed into a rod or the like is subjected to pressure by a power-driven extruding ram 15 mounted on a cross-head 16, by means of a collar 17 which embraces the enlarged end portion 18 of the ram and is secured to a guide block 19 carried by the cross-head. This cross-head is slidably mounted on four horizontal columns 20 which pass through openings in two large abutments 21 and 21ᵃ forming the main frame of the press, these columns being secured in place by locking members 22 threaded onto the columns at the ends thereof and bearing against the abutments. The cross-head 16 is moved to drive the ram forward by a hydraulic plunger 23 abutting against the guide block 19 to which it is suitably secured and operating in a large hydraulic cylinder 24 supported by the abutment 21 of the main frame. This cylinder is connected by a pipe 25 and a valve 25ª, hereinafter further mentioned, with a water supply pipe leading from the pumps. Admission of water to the cylinder by means of the valve drives the plunger, and hence the cross-head and ram, forward. Retraction of the cross-head to withdraw the ram is accomplished by two pair of draft rods 26 located above and below the large ram cylinder. Each pair of rods is fastened at one end to a rib 27 on the cross-head 16, and at the opposite end to a yoke 28 arranged to slide on a track 29, and secured to the end of a piston rod 30, the piston 31 of which operates in a relatively small hydraulic pull-back cylinder 32 suitably supported by the main frame. These two pullback cylinders are directly connected by pipes 33 with the main water supply, thus being under constant pump pressure, so that their tendency is to move the cross-head and ram backward, but, owing to their relatively small size, their power is only effective when the water pressure is removed from the large ram cylinder.

Figure 1:
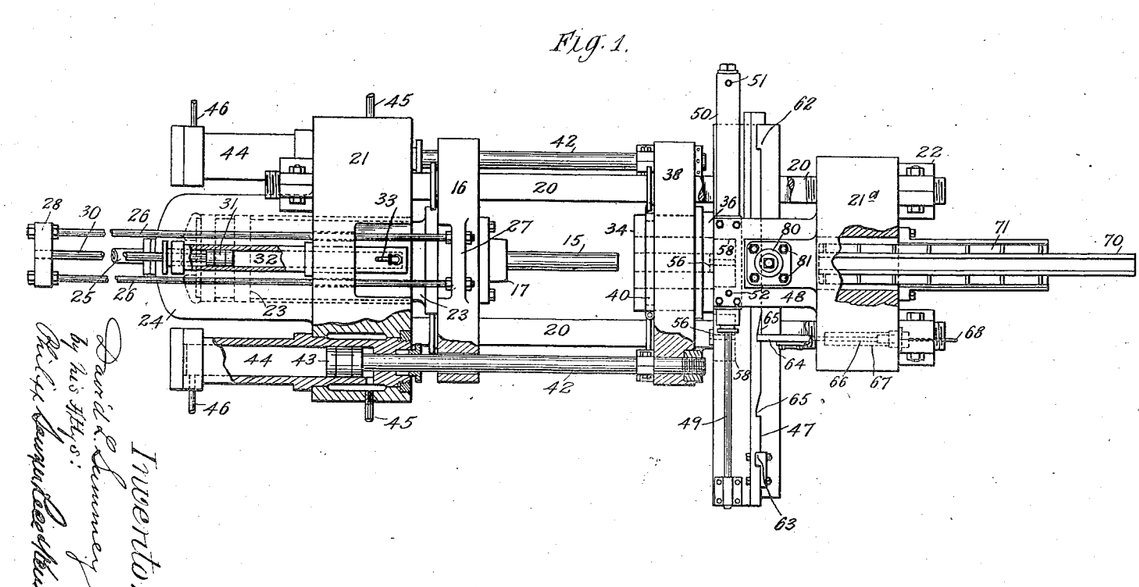
Figure 1 is a plan view of an extrusion press constructed in accordance with the present invention, showing parts in section.
Figure 2:
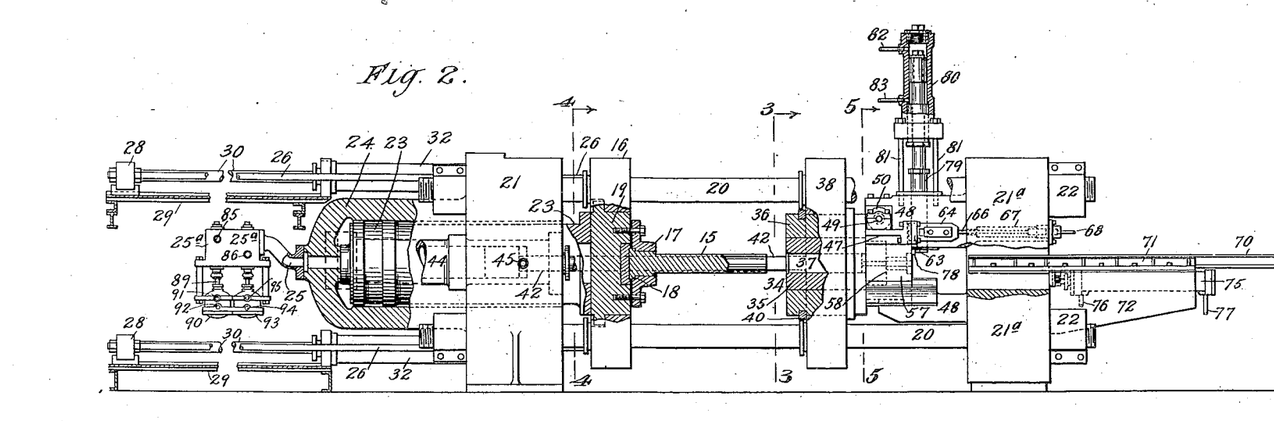
Fig. 2 is a side elevation of the same; also showing parts in section.
Figure 3:
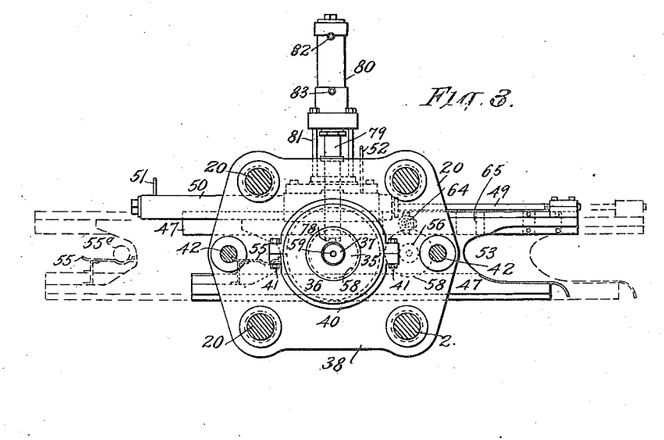
Figs. 3, 4, 5 are views in cross-section, the sections being taken on the line 3—3, 4—4 and 5—5, respectively, of Fig. 2, looking in the direction of the arrows.
Figure 4:
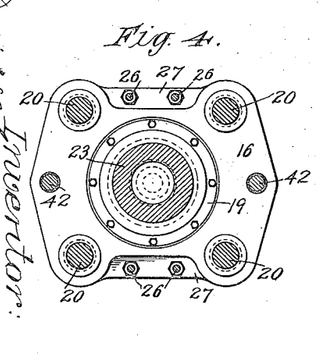

The billet is held, during the operation of the extruding ram, by a container 34 which is movable to and away from extrusion position. This container may be of a variety of constructions. In the embodiment shown, the container consists of two concentric cylindrical sleeves 35 and 36, forming, in effect, a block having a central billet chamber 37, and its movement is effected by a cross-head 38 which carries it. This cross-head, like the one carrying the ram, is slidably mounted on the columns 20. It has a central opening designed to receive the outer sleeve 36 of the container which is formed with an annular shoulder 39 bearing against the cross-head, and an annular groove in which fits a two-part ring 40 so as to bear against the other side of the cross-head. The two parts of the ring are secured together by bolts as at 41 (Fig. 3). To move this container-carrying cross-head, it is attached at the sides to piston rods 42, the pistons 43 of which operate in hydraulic cylinders 44, these two cylinders being supported on either side of the large ram cylinder by the abutment 21. These cylinders are connected at each end with the main water supply. A pipe 45, leading from the end of the cylinder in which the piston rod enters, makes direct connection with the supply pipe, while a pipe 46 at the other end leads to an intervening water-controlling valve 46ª. When this valve admits water to the cylinder, the pressure acts on an area larger than the area under constant pressure at the other end, and so overcomes the latter and drives the piston forward to move the container toward extrusion position. When, however, the pressure is removed by the valve, the constant pressure at the other end becomes effective and causes the container to be withdrawn.

Figure 5:
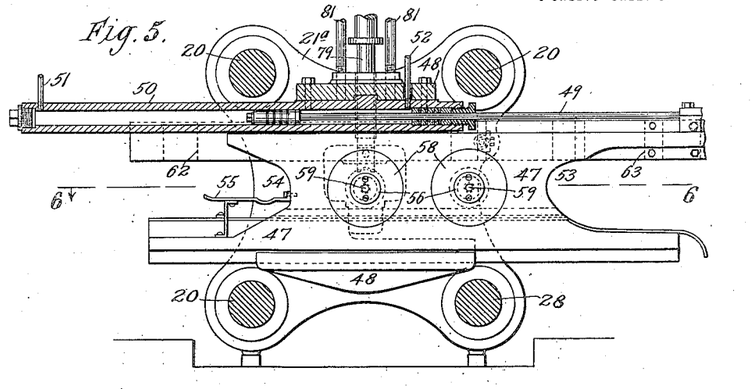
Figure 6:
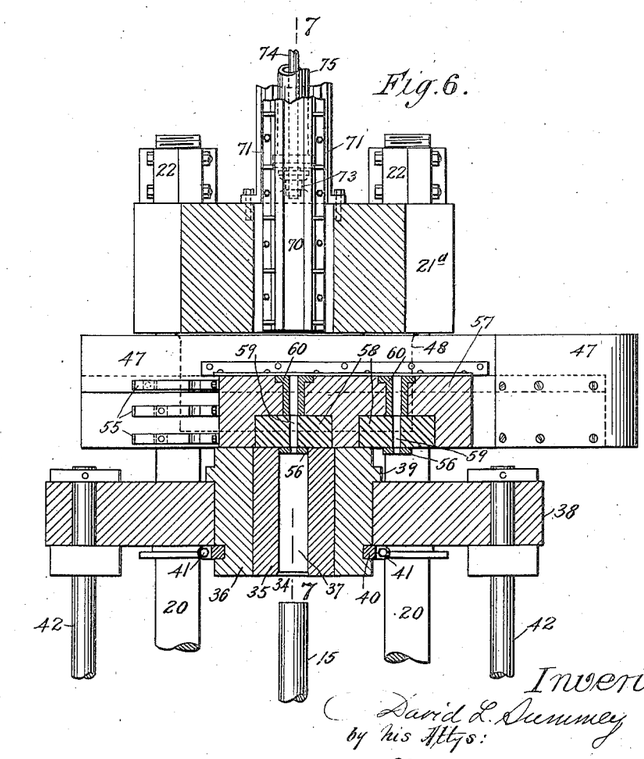
Fig. 6 is a cross-sectional view taken on the line 6—6 of Fig. 5, looking in the direction of the arrows;
Figure 7:
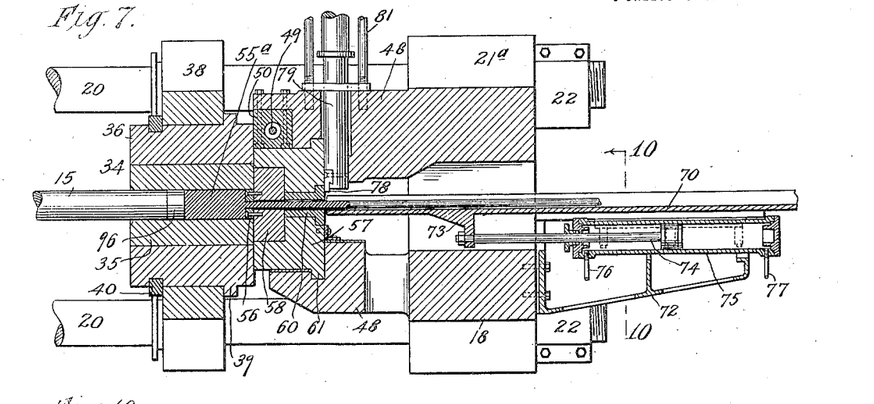
Fig. 7 is a cross-sectional view taken on the line 7—7 of Fig. 6.
Figure 8:
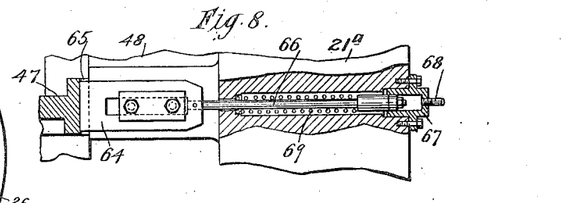
Fig. 8 is an enlarged detail showing the stop-latch in side elevation.
Figure 9:
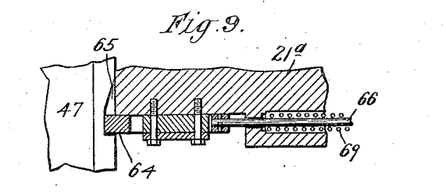
Figure 10:
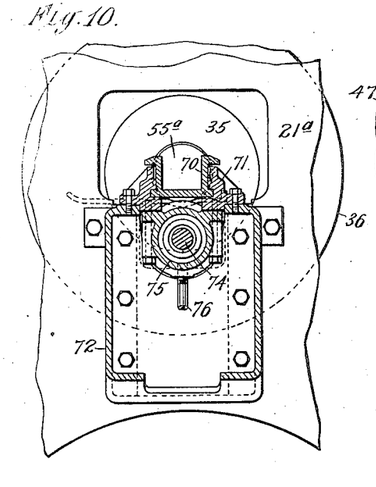
Fig. 10 is a cross-sectional view taken on the line 10—10 of Fig. 7, looking in the direction of the arrows.

In extrusion machines constructed in accordance with the present invention, the billet chamber is accessible, for insertion of the billet and for expulsion of the stump, at the end through which the metal is extruded, and provision is made for carrying up billets to the chamber for insertion therein and likewise for carrying up interchangeable dies to position the same in alinement with the chamber. All this may be accomplished in various ways and by various constructions, as, for example, by a carrier movable across the end of the container either by rotary or reciprocating movement, for carrying billet and die into position and for exposing the end of the chamber to render it accessible. In the embodiment shown, this carrier is a horizontal reciprocating slide 47 bearing at top and bottom against a two-part extension 48 of the large abutment 21ª, and located so that it may be in contact with the container during extrusion. In order to move the carrier, it is attached at one end (Fig. 5) to a piston rod 49, the piston of which operates in a hydraulic cylinder 50 carried by the abutment extension 48. This cylinder is connected at each end, by pipes 51 and 52, with the water-supply pipes, connection 51 having an intervening hydraulic valve 51ª, so that when this valve admits water, the pressure causes the piston to force the rod out of the cylinder against the constant pressure at the other end (the pressure acting on a greater area in that direction), and when pressure is removed by the valve, the constant pressure at the other end of the cylinder moves the piston in the opposite direction.

In order to render the billet-chamber accessible for insertion of the billet and removal of the stump, as hereinafter described, the slide is cut away at each end to form deep offsets 53 and 54 (Fig. 5) so that when the slide reaches either end of its stroke the end of the billet-chamber is exposed by one or the other of these offsets and a billet may be inserted or a stump removed, as the case may be. For carrying the billet, in the most advantageous embodiment of the invention, a cradle is provided. In the construction shown, this cradle consists of a plurality of supports 55 suitably secured to the slide. The cradle thus formed is designed to hold a billet 55ª which is ordinarily cylindrical in shape, in a position transverse of the carrier and substantially at the limit of the offset 53, as appears in Fig. 3, so that when the chamber is exposed by the movement of the carrier, the billet is in a position to be inserted in the chamber as hereinafter described.

This carrier, as before mentioned, also brings into position, opposite the billet-chamber, the die through which the metal is extruded. This may be done in various ways. In the embodiment of the invention shown in Figs. 1 to 7, secured to the face of the carrier toward the container is a plurality of dies 56 centered on a line at right angles to the axis of the billet-chamber. These dies may be secured to the face of the carrier in any suitable manner, as by bolts, and may be either flush or projecting, as shown. These dies are interchangeable, and as either one or the other can be placed in operative position, one may cool while the other is in use. Ordinarily these dies will be identical but they may, of course, differ as to the die-openings, the dies themselves being still interchangeable. For the purpose of illustration, only two dies have been shown, but this number has been shown to simplify the drawings, and as an example, and it is to be understood that the invention is not limited to any precise number of dies. It may be desirable to utilize more than two dies in order to give each die more time to cool. In such case, it is only necessary to lengthen the carrier accordingly and duplicate the parts associated with each die.

Since great pressure is exerted on the die during extrusion, it is necessary to provide a strong backing. In the present instance, this backing is the die carrier itself. The central portion of the carrier is a thick, heavy block 57. Set in this block, immediately behind the die, is a thick cylinder 58 substantially larger in diameter than the die. This cylinder has a passage 59 therethrough registering with the die-opening and being continued through a sleeve 60, also set in the large block 57, to the back of the carrier, whereby the extruded metal may pass through the carrier as the rod is formed. The back of the large block 57 abuts at the top and bottom against the abutment extension 48 (Fig. 7) and shoulders 61 on the top and bottom of the block fit in corresponding grooves in the abutment. Thus the die is backed by the strong heavy block of the carrier which, in turn, is rendered rigid, except for its transverse sliding movement, by being firmly anchored in the heavy abutment head 21ª.

The slide carrier takes, during the operation of the machine, a number of different positions and to properly govern its movement, automatic stops are provided. At the billet-carrying end of the slide is a stop 62 which makes contact with the frame of the press to stop the carrier in billet insertion position with the chamber exposed by the offset 54. At the other end is a similar stop 63 which makes contact with the frame of the press to stop the carrier, when moving in the opposite direction, in a position such that the offset 53 exposes the end of the billet-chamber for expulsion of the stump. For the die centering positions, a latch 64 is provided, which enters notches 65 cut in the slide, there being one notch for each die. This latch is attached to the end of a piston rod 66, the piston of which operates in an air cylinder 67 carried by the abutment 21ª and supplied with air under pressure by a pipe 68. This pressure causes the latch to move into the notches as the carrier slides past the same, withdrawal of the latch being effected by a coil-spring 69 which bears against the supporting frame at one end and against the piston at the other and which is of a force to act on the piston to displace the piston rod when the air pressure is removed. One side of each notch is abrupt and the other side sloping, so that after a billet has been placed on its cradle, the carrier can move over to billet-insertion position regardless of the latch which, though entering the notch, merely rides up the slope of the same. But when the carrier moves back to die-centering position and the latch slips into the notch, its contact with the abrupt face stops the carrier. Any notch may be allowed to pass by the latch by cutting off the air from the cylinder, whereupon the latch withdraws until air is again admitted.

Figure 11:
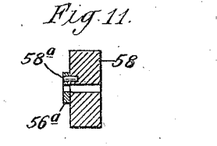
Fig. 11 is a detailed view showing, in cross-section, a modification of a portion of the die-carrier.

It may be desirable to have the interchangeable dies carried up to extrusion position in a different manner. For example, instead of having a plurality of dies secured to the carrier, a number of interchangeable unattached dies may be used. In such case there is only one set of die backing blocks and one notch for stopping the carrier and the carrier is correspondingly shortened. The block 58 of the carrier is provided with a pin 58ª (Fig. 11), each die 56ª having in its back face a corresponding recess. When the carrier is in its billet-insertion position, a workman hangs one of the dies on the pin 58ª, and it will then be carried into extrusion position as before. For the next extrusion another die is used, so that in either case, namely, whether the unattached dies or the permanent dies are used, there is no cessation in the operation of the press while a die is cooling.

The invention includes means for inserting the billet into the chamber after it has been brought up into position by the carrier. Although this may be accomplished in various ways, in the preferred form of the invention a billet-pusher is provided in the form of a trough 70, which is slidable in a track 71 carried on a base 72 bolted to the end of the large abutment 21ª. In order to move the pusher a depending lug 73 is attached to the end of a piston rod 74, the piston of which operates in an air cylinder 75, carried by the base 72. The cylinder is connected on each side of the piston with air pressure supplying pipes 76 and 77, and air is admitted through one pipe or the other to advance or withdraw the pusher. This trough is of such length that, when the slide carrier has positioned the billet, it can advance through the open part of the press frame to abut against the end of the billet and force the same into the chamber of the container. This trough, which is in alinement with the die, also serves to receive the extruded rod and act as a support for the same until the rod reaches suitable bearing-off rolls (not shown).

To sever the extruded rod from the sprue, a cutter is provided. Although this cutting means may be of various constructions and arrangements, in the present embodiment it is in the form of a drop-bar shears. A curved cutting plate 78 is secured to the end of a vertically reciprocating ram 79 operating in a hydraulic cylinder 80 supported by columns 81 arising from the abutment extension 48. The cylinder is connected at each end with the water supply by pipes 82 and 83, pipe 82 having an intervening valve 82$^a$. Pressure at this end acts on a greater area, so that when water is admitted by the valve, the cutting ram is forced downward to cut the rod, and when pressure is removed by the valve the constant pressure at the other end becomes effective and causes the ram to be withdrawn into inoperative position. This cylinder is so located that the ram drops in close proximity to the back of the die-carrier, so that the extruded rod is cut off at substantially the point where it emerges from the carrier. This leaves, connected to the sprue, a short stump representing the metal in the die and the passage through the carrier.

Figure 12:
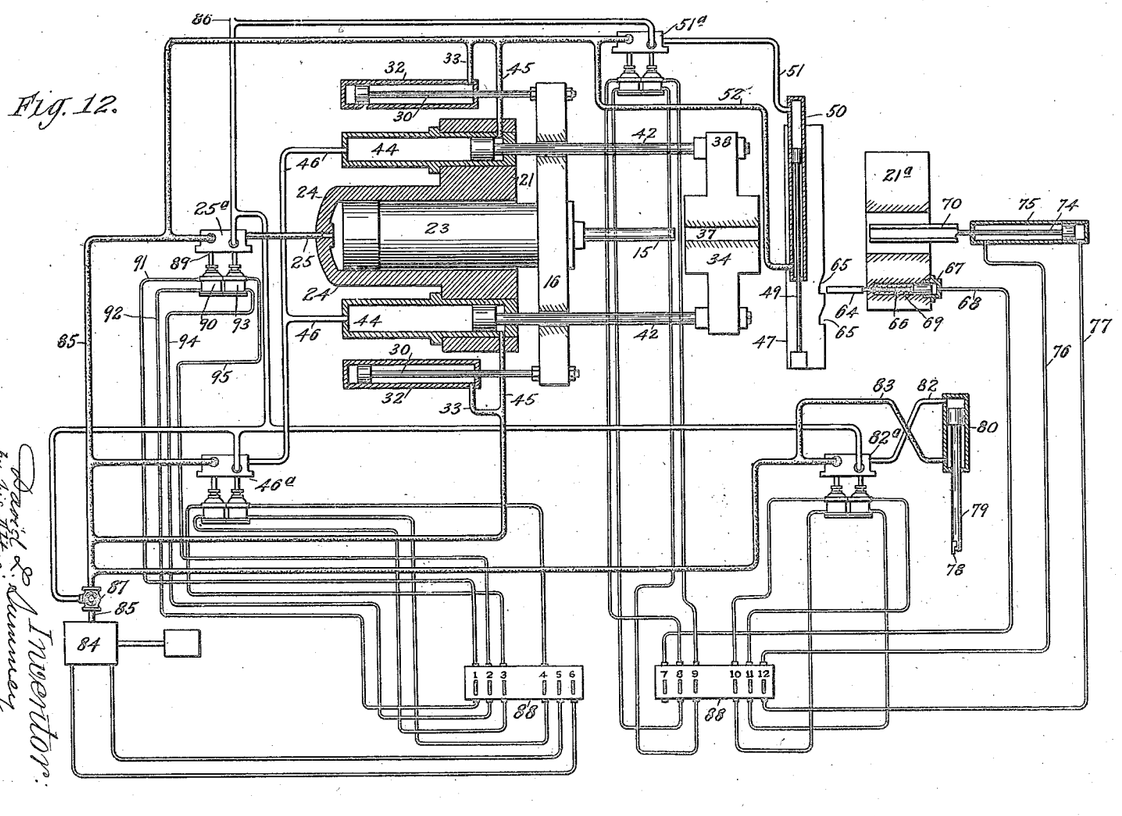
Fig. 12 is a diagrammatic view illustrating the piping and the like, by means of which the moving parts of the machine are operated and controlled.
Figure 13:
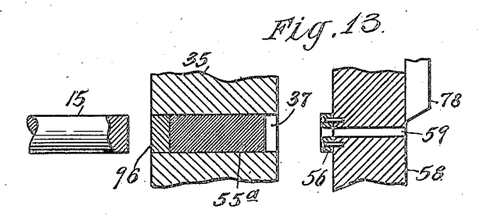
Figs. 13 to 17 inclusive are diagrammatic views showing, respectively, the position of the parts before extrusion; during extrusion; following the severing of the extruded part; following the withdrawal of the stump from the die; and following expulsion of the stump and sprue.
Figure 14:
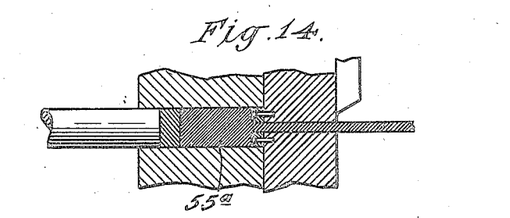
Figure 15:
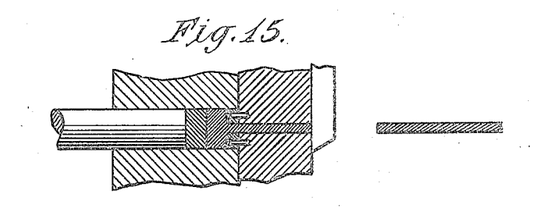
Figure 16:
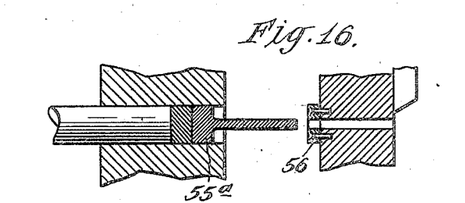
Figure 17:
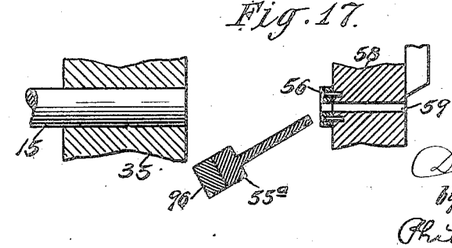

Fig. 12 illustrates diagrammatically the piping and control for the several cylinders. Suitable pumps, represented at 84, feed water under high pressure to a main supply pipe 85 having branches leading to the inlet portions of the ram control valve 25$^a$, the container control valve 46$^a$, the carrier control valve 51$^a$ and the shears control valve 82$^a$, respectively. This supply pipe, through its branches, also supplies water direct to the container, carrier and shears cylinder by connecting pipes 45, 52 and 83 respectively, as already described. A main exhaust pipe 86 has branches leading from the exhaust portions of the four control valves just mentioned and from a by-pass 87 located in the main supply pipe 85 and hand operated to relieve the pressure when desired. The four hydraulic control valves are identical and are of any suitable construction to control the inlet and exhaust of water to and from their respective cylinders. These valves are operated by an air pressure system which also operates other parts of the machine, as hereinafter appears, and which includes a central control station 88 where the operator controls the entire operation of the press. At this central station is a number of air pilot valves, twelve being represented in this instance, suitably connected to a supply of air under pressure. These valves are of any suitable construction, such as the well-known D-slide valve, to direct a flow of air in one direction or the other by manipulation of a lever. Taking, for example, the inlet of the ram cylinder control valve 25$^a$, this is opened and closed by a short piston rod 89, the piston of which operates in an air cylinder 90, the ends of the cylinder being connected to pipes 91 and 92 leading to air pilot valve No. 1 at the central station. This latter can admit air into either pipe 91 or 92, to move the piston rod 89 one way or the other and thus to operate the inlet valve for the ram cylinder. The exhaust of this hydraulic valve 25$^a$ is similarly controlled, and its operating cylinder 93 has two air pipes 94 and 95 leading to air pilot valve No. 2 of the central station. Similarly, the hydraulic control valve 46$^a$ for the container cylinders (which have a common feed pipe from the valve so as to operate simultaneously) is controlled by pilot valves Nos. 3 and 4; the valve 51$^a$ for the carrier cylinder by Nos. 8 and 9; and the valve 82$^a$ for the shears cylinder by Nos. 10 and 11. Pilot valve No. 7 controls admission of air to the latch cylinder by pipe 68 and No. 12 controls admission of air to one end or the other of the billet pusher cylinder by pipes 76 and 77. The remaining pilot valves, Nos. 5 and 6, have pipes leading to the pumps for lifting the pump valves to cut off the flow without stopping the pumps.

In describing the operation of the press, it is assumed that the air pilot valves are operated to cause movements of the parts as described. In practice, the ram is not made to fit tightly in the container chamber but a dummy block 96 which is tight fitting is placed in front of the ram by a workman just before the ram enters the chamber, this block being forced against the billet by the ram. For the purpose of description, however, the dummy block will be treated as a part of the ram itself. Assuming the ram, container, shears and pusher are in withdrawn position and the carrier in the position shown in Fig. 3, a billet which has been previously heated is placed on the cradle 55 and the carrier is moved over until the stop 62 strikes the frame of the press, the latch meanwhile, if under air pressure, riding over the slopes of the notches. In this position, the billet is opposite the container which is moved up to within a short distance of the carrier. The billet-pusher is advanced, and, abutting against the billet, forces the latter into the chamber of the container, whereupon the pusher is withdrawn to clear the path of the carrier. The carrier moves back on its return stroke, until the latch slips into the first notch, thus stopping the carrier with the first die in extrusion position. If it is desired to use the second die, instead of the first, the latch is withdrawn, by cutting off the air, until the first notch has passed. The desired die being in position, the container advances until it abuts against the carrier with the chamber embracing the die, and the pusher is moved up to abut against the back of the carrier to act in its capacity of supporting trough. The press is now ready for extrusion and the ram is advanced against the billet, the pressure forcing the metal through the die, the extruded rod being borne by the trough 70 until it reaches the bearing off rolls. When all but a short dead end has been extruded, the ram is withdrawn and the shears dropped to cut off the rod which is then free to be removed. To get rid of the stump and the sprue the container is moved back, this movement of the container first withdrawing the stump from the die and the carrier and then, as its backward stroke continues, bringing the sprue into contact with the end of the ram which will cause sprue and stump (and also the dummy block) to be ejected from the container chamber, whereupon they fall to the bottom of the press. This method of expelling the severed stump and sprue by movement of the container aids in attaining rapid operation of the press, since use for expulsion of the slower moving ram may be avoided. It is noted that this expulsion of the stump occurs when the container is removed from contact with die and die-carrier, and it can take place any time during this backward stroke of the container after the stump clears the die, the precise point depending on the position of the ram. This, with the withdrawal of the parts to the starting point, completes the cycle of an extrusion operation. While stump and sprue are being ejected the carrier, which is, it will be noted, in proper position, is receiving a new billet and the cycle is repeated, except that a different die is used so that the first one may cool. Although the carrier is not in exactly the same position at the end of each cycle, such as above described, owing to the difference in position of the several dies, it is nevertheless always in billet-receiving position, inasmuch as the billet carrying cradle does not need to register exactly with respect to a given point, so that whichever die is used, the movement of the carrier in the above cycle to position the die, places the carrier in billet-receiving position.

In case the sprue is wedged abnormally tightly in the chamber, or in case of the "freezing" of an improperly heated billet, it is possible to utilize the force of the ram itself to eject such sprue or billet, and this method of expulsion entails a slightly different cycle of operations. In such case, after the ram is withdrawn, the container is moved back to withdraw the stump from the carrier and die, and the carrier (the latch being withdrawn) is moved over until offset 53 exposes the end of the chamber. Thereupon the ram is advanced and its great force expels the "frozen" sprue or billet from the container, the latter being backed by the slide during the expulsion operation, and the ejected sprue, stump and dummy block fall to the sloping plate which forms part of the slide and so roll away to the side of the press. Although this leaves the billet-receiving end of the carrier further displaced than normally, it may still be considered as in billet-receiving position, and a new billet having been placed on the cradle, the carrier is ready to be moved over to billet-insertion position for the start of the next cycle.

In case the unattached dies are utilized, the operation of the press is the same as above described, except that, while the carrier is in billet-insertion position, the unattached die is hung on the pin on the carrier by a workman and when the carrier is moved back to withdraw the stump from the carrier and eject the same, the die and stump are withdrawn and ejected together, the die being later removed from the stump by hand.

Many of the above movements described as being successive are, in actual practice, overlapping and even practically simultaneous, and as there are no interruptions or undue delays for die cooling, stump removal and the like, the operation of the press is both rapid and continuous.

While the product of the extrusion has been referred to as a rod, it is to be understood that this term is not a limitation and includes other shapes, tubes, and the like. So, too, while the operating means has been described as an air controlled hydraulic system, the invention is not limited to such a system.

What is claimed is:

1. In a machine for extruding metal, the combination with a metal-extruding ram, of a movable billet container, and a die carrier movable in a path across the path of the container.

2. In a machine for extruding metal, the combination with a metal-extruding ram, of a container having a billet-chamber through one end of which the metal is extruded, a die carrier movable across the extrusion end of the chamber to position a die and to expose the end of the chamber for insertion of a billet.

3. In a machine for extruding metal, the combination with a metal-extruding ram, of a container having a billet-chamber through one end of which the metal is extruded, a die carrier movable across the extrusion end of the chamber to position a die and to expose the end of the chamber for insertion of a billet and expulsion of stump and sprue.

4. In a machine for extruding metal, the combination with a metal-extruding ram, of a container having a billet-chamber, and a die carrier movable across the end of the chamber for placing a die in position for the extrusion operation.

5. In a machine for extruding metal, the combination with a metal-extruding ram, of a container having a billet-chamber, and a billet and die carrier movable to position a billet for insertion in the chamber and a die for the extrusion operation.

6. In a machine for extruding metal, the combination with a metal-extruding ram, of a container having a billet-chamber, a billet and die carrier movable to position the billet for insertion in the chamber and the die for the extrusion operation, and means for inserting the billet in the chamber.

7. In a machine for extruding metal, the combination with a metal-extruding ram, of a container having a billet-chamber, means for placing a billet in position for insertion in the chamber, means for inserting the billet, and means for moving a die into position for the extrusion operation.

8. In a machine for extruding metal, the combination with a metal-extruding ram, of a container having a billet-chamber, and a member movable across the end of the chamber to expose the same and to carry a billet into position for insertion in the chamber and a die into position for extrusion.

9. In a machine for extruding metal, the combination with a metal-extruding ram, of a container having a billet-chamber, a billet and die carrier movable to position a billet for insertion in the chamber and a die for the extrusion operation, means for expelling the severed stump and sprue from the chamber, the position of the carrier during stump expulsion placing it in billet-receiving position.

10. In a machine for extruding metal, the combination with a metal-extruding ram, of a container having a billet-chamber, a billet and die carrier movable to place a billet in position for insertion in the chamber, and to place a die in position for extrusion, the movement of said carrier to position the die placing the carrier in billet-receiving position.

11. In a machine for extruding metal, the combination with a metal-extruding ram, of a container having a billet-chamber, a billet and die carrier movable to position a billet for insertion in the chamber and a die for the extrusion operation, said carrier also serving as a backing for the die during the operation of the ram.

12. In a machine for extruding metal, the combination with a metal extruding ram, of a billet container, a die carrier movable across the axis of the container, and a solid backing for anchoring said die carrier against motion in the direction of movement of said ram.

13. In a machine for extruding metal, the combination with a metal-extruding ram, of a container having a billet-chamber, a die, a member extending away from said chamber to support the extruded metal, said member being movable toward said chamber to insert therein a billet previously positioned in alinement with the chamber.

14. In a machine for extruding metal, the combination with a metal-extruding ram, of a container having a billet-chamber, a die, means for positioning a billet for insertion in the chamber, a member movable to insert the billet, said member serving as a support for the extruded metal.

15. In a machine for extruding metal, the combination with a metal-extruding ram, of a container having a billet-chamber, and means whereby the severed stump and sprue may be expelled by movement of the container.

16. In a machine for extruding metal, the combination with a metal-extruding ram, of a container having a billet-chamber, said container being movable so as to bring the sprue and severed stump into contact with the ram, thereby to expel sprue and stump from the chamber.

17. In a machine for extruding metal, the combination with a metal-extruding ram, of a container having a billet-chamber, and a die carrier movable across the axis of the chamber to expose the end of the chamber, thereby to permit the severed stump and sprue to be expelled from the chamber by movement of the ram.

18. In a machine for extruding metal, the combination with a metal-extruding ram, of a container having a billet-chamber, a movable die carrier, means for withdrawing the severed stump from said carrier, the carrier being movable to expose the end of the chamber thereby to permit the stump and sprue to be expelled from the chamber by movement of the ram.

19. In a machine for extruding metal, the combination with a metal-extruding ram, of a container having a billet-chamber, a movable die carrier, the container being movable to withdraw the severed stump from said carrier, the carrier being movable to expose the end of the chamber, thereby to permit the stump and sprue to be expelled from the chamber by the movement of the ram.

20. In a machine for extruding metal, the combination with a metal-extruding ram, of a container for a billet, a die and a support therefor through which the extruded metal passes, and means for cutting off the extruded metal substantially at the point where it emerges from said support.

21. In a machine for extruding metal, the combination with a metal-extruding ram, of a container for a billet, a die and a support therefor through which the extruded metal passes, means for cutting off the extruded metal beyond the point where it emerges from said support, and means for withdrawing the stump.

22. In a machine for extruding metal, the combination with a metal-extruding ram, of a container for a billet, a die and a support therefor through which the extruded metal passes, and means for cutting off the extruded metal beyond the point where it emerges from the support, said container being movable to withdraw the stump.

23. In a machine for extruding metal, the combination with a metal-extruding ram, of a container for a billet, a die and a support therefor through which the extruded metal passes, and means for cutting off the extruded metal beyond the point where it emerges from the support, said container being movable to withdraw the stump and to expel the stump and sprue.

24. In a machine for extruding metal, the combination with a metal-extruding ram, of a container for a billet, a die and a carrier therefor through which the extruded metal passes, means for cutting off the extruded metal beyond the point where it emerges from the carrier, and means for withdrawing the stump, said die carrier being movable to expose the chamber to permit expulsion of the sprue and stump by movement of the ram.

25. In a machine for extruding metal, the combination with a metal-extruding ram, of a container for a billet, a die and a carrier therefor through which the extruded metal passes, and means for cutting off the extruded metal beyond the point where it emerges from the carrier, the container being movable to withdraw the stump, and the carrier being movable to expose the end of the chamber to permit expulsion of the stump and sprue by movement of the ram.

26. In a machine for extruding metal, the combination with a metal-extruding ram, of a billet-container, a die secured to a support through which the extruded metal passes, and means for cutting off the extruded metal beyond the point where it emerges from said support, said container being movable to withdraw the stump from the die.

27. In a machine for extruding metal, the combination with a metal-extruding ram, of a container having a billet-chamber, a billet carrier movable with respect to said container for carrying billets into position for insertion into the container, and means for automatically stopping said carrier so as to position the billet for insertion in the chamber.

28. In a machine for extruding metal, the combination with a metal-extruding ram, of a container having a billet-chamber, a billet carrier for carrying billets into position for insertion into the container, means for moving said carrier with respect to said container, means for automatically stopping said carrier so as to position the billet for insertion in the chamber, and means for inserting the billet in the chamber.

29. In a machine for extruding metal, the combination with a metal-extruding ram, of a container having a billet-chamber, a die, a carrier therefor movable across the axis of the chamber, and means for automatically stopping said carrier so as to position the die for the extrusion operation.

30. In a machine for extruding metal, the combination with a metal-extruding ram, of a container having a billet-chamber, a billet and die carrier movable to carry up a billet for insertion in the chamber and to carry up a die into position for extrusion, and means for automatically stopping said carrier in its billet-insertion position and in its die-positioning movement to place the die in extrusion position.

31. In a machine for extruding metal, the combination with a metal-extruding ram, of a container having a billet-chamber, and means for successively placing interchangeable dies in operative position.

32. In a machine for extruding metal, the combination with a metal-extruding ram, of a container having a billet-chamber, and a die carrier for successively placing interchangeable dies in operative position.

33. In a machine for extruding metal, the combination with a metal-extruding ram, of a container having a billet-chamber, a plurality of interchangeable dies, and a carrier therefor.

34. In a machine for extruding metal, the combination with a metal-extruding ram, of a container having a billet-chamber, a plurality of interchangeable dies, and means for placing one of said dies in operative position, the others being in inoperative position.

35. In a machine for extruding metal, the combination with a metal-extruding ram, of a container having a billet-chamber, a plurality of interchangeable dies, and means for successively placing said dies in operation.

36. In a machine for extruding metal, the combination with a metal-extruding ram, of a container having a billet-chamber, a plurality of interchangeable dies, and means for placing in operative position any predetermined die.

37. In a machine for extruding metal, the combination with a metal-extruding ram, of a container having a billet-chamber, and a die carrier movable across the end of said chamber to carry one of a plurality of interchangeable dies into operative position for extrusion.

38. In a machine for extruding metal, the combination with a metal-extruding ram, of a container having a billet-chamber, and a plurality of dies carried by a die and billet carrier, said carrier being movable to expose the end of said chamber for insertion of the billet, to place a die in operative position, and to expose the end of said chamber for expulsion of the stump and sprue.

39. In a machine for extruding metal, the combination with a metal-extruding ram, of a container having a billet-chamber, a die secured to a support, and means for withdrawing the severed stump from the die.

40. In a machine for extruding metal, the combination with a metal-extruding ram, of a container having a billet-chamber, a die secured to a support, said container being movable to withdraw the severed stump from the die.

41. In a machine for extruding metal, the combination with a metal-extruding ram, of a container having a billet-chamber, and a die secured to a support, said container being movable away from the die and toward the withdrawn ram, thereby to withdraw the severed stump from the die and cause it to be expelled from the chamber by contact with the ram.

42. In a machine for extruding metal, the combination with a metal-extruding ram, of a container having a billet-chamber, a die secured to a support, and means for withdrawing the severed stump from the die, said support being movable to expose the end of the chamber to permit expulsion of the stump and sprue by the movement of the ram.

43. In a machine for extruding metal, the combination with a metal-extruding ram, of a container having a billet-chamber, a plurality of interchangeable dies, and a billet and die carrier movable across the end of said chamber to carry a billet to a position for insertion in said chamber, and to place any given die in position for extrusion.

44. In a machine for extruding metal, the combination with a metal-extruding ram, of a container having a billet-chamber, a plurality of interchangeable dies, a billet and die carrier movable across the end of said chamber to carry a billet and the dies up to the chamber, means for automatically stopping said member to position the billet for insertion in the chamber, and means for automatically stopping said member to place a given die in position for extrusion.

45. In a machine for extruding metal, the combination with a metal-extruding ram, of a container having a billet-chamber, and a die carrier movable across the end of said chamber, said container being movable toward the die carrier to abut against the same with the chamber embracing the die, and away from the die carrier during movement of the same.

46. In a machine for extruding metal, the combination with a metal extruding ram, of a container having a billet chamber, a billet and die carrier movable across the extrusion end of said chamber, means for moving said carrier to place a billet in position for insertion in the chamber, means for inserting the billet, means for moving the carrier to place a die in position for extrusion, means for cutting the extruded metal, and means for moving the container to withdraw the stump from the die.

47. In a machine for extruding metal, the combination with a metal extruding ram, of a container having a billet chamber, a billet and die carrier movable to carry up a billet for insertion in the chamber and to carry up a die into position for extrusion, a plurality of notches associated with said carrier, a latch movable into and out of position to engage said notches, and means for controlling said latch.

48. In a machine for extruding metal, the combination with a metal-extruding ram, of a container having a billet-chamber through one end of which the metal is extruded, and a die carrier reciprocating across the extrusion end of the chamber to position a die and to expose the end of the chamber for insertion of a billet and expulsion of stump and sprue.

49. In a machine for extruding metal, the combination with a metal-extruding ram, of a movable billet-container, and a die carrier movable in a reciprocating path across the path of the container.

50. In a machine for extruding metal, the combination with a metal-extruding ram, of a container having a billet-chamber through one end of which the metal is extruded, and a die carrier movable in a reciprocating path across the extrusion end of the billet-chamber to position a die and to expose the end of the billet-chamber for insertion of a billet.

51. In a machine for extruding metal, the combination with a metal-extruding ram, of a container having a billet-chamber, and a billet and die carrier reciprocating across the axis of the container to position a billet for insertion in the chamber and a die for the extrusion operation.

52. In a machine for extruding metal, the combination with a metal-extruding ram, of a container having a billet-chamber, a billet and die carrier reciprocating across the axis of the container, a stop for limiting the movement of said carrier in either direction, a latch for stopping said carrier in an intermediate position, and means for controlling said latch.

In testimony whereof, I have hereunto set my hand.

DAVID L. SUMMEY.